(12) United States Patent
Pezdirc

(10) Patent No.: US 9,801,222 B1
(45) Date of Patent: Oct. 24, 2017

(54) SYSTEMS AND METHODS FOR PAIRING MOBILE DEVICES

(71) Applicant: MM Mobile, LLC, Dover, DE (US)

(72) Inventor: Masa Pezdirc, Los Angeles, CA (US)

(73) Assignee: MM Mobile, LLC, Dover, DE (US)

( * ) Notice: Subject to any disclaimer, the term of this patent is extended or adjusted under 35 U.S.C. 154(b) by 0 days.

(21) Appl. No.: 15/386,739

(22) Filed: Dec. 21, 2016

Related U.S. Application Data

(63) Continuation-in-part of application No. 15/286,554, filed on Oct. 5, 2016.

(51) Int. Cl.
  *H04W 76/02* (2009.01)
  *H04W 4/02* (2009.01)
  *H04W 4/00* (2009.01)

(52) U.S. Cl.
  CPC ......... *H04W 76/023* (2013.01); *H04W 4/008* (2013.01); *H04W 4/025* (2013.01)

(58) Field of Classification Search
  CPC . H04B 5/0031; H04B 5/0025; H04L 63/0492; H04M 1/10; H04M 1/7253; H04W 4/008; H04W 4/025; H04W 4/026
  See application file for complete search history.

(56) References Cited

U.S. PATENT DOCUMENTS

| | | | |
|---|---|---|---|
| 8,781,393 B2 | 7/2014 | Taveau et al. | |
| 8,803,888 B2 | 8/2014 | Buban | |
| 9,219,528 B2 | 12/2015 | Tanaka | |
| 2010/0278345 A1 | 11/2010 | Alsina et al. | |
| 2011/0154014 A1* | 6/2011 | Thorn | H04M 1/7253 713/150 |
| 2011/0191823 A1 | 8/2011 | Huibers | |
| 2014/0206288 A1* | 7/2014 | Liu | H04W 12/04 455/41.2 |
| 2015/0215770 A1 | 7/2015 | Chan et al. | |
| 2016/0142867 A1* | 5/2016 | Kim | H02J 7/025 455/41.1 |
| 2016/0198499 A1* | 7/2016 | Lee | H04M 11/00 455/450 |
| 2016/0337001 A1* | 11/2016 | Que | H04B 5/0012 |

\* cited by examiner

*Primary Examiner* — Benjamin H Elliott, IV
(74) *Attorney, Agent, or Firm* — Goodwin Procter LLP

(57) ABSTRACT

The present disclosure relates to a system and methods for exchanging information between a plurality of mobile devices by pairing the two mobile devices based on proximity of the two mobile devices. In some implementations, the method includes determining a geographic position and angular orientation of the devices. In other implementations, the method includes determining that at least one mobile device heard a unique sound produced by the other mobile device. Once paired, the server can send information to one or both of the mobile devices and, in some cases, can revoke the exchanged information, e.g., in response to a revocation request.

20 Claims, 7 Drawing Sheets

SYSTEMS AND METHODS FOR PAIRING MOBILE DEVICES

CROSS-REFERENCE TO RELATED APPLICATION

This application is a continuation-in-part of and claims priority to U.S. patent application Ser. No. 15/286,554, entitled A System and Method for Proximity Based Pairing and Information Exchange Between Mobile Devices, filed Oct. 5, 2016, the entire disclosure of which is incorporated by reference herein in its entirety.

FIELD OF THE INVENTION

The present disclosure generally relates to exchanging information between mobile devices and, more particularly, relates to pairing the mobile devices based on their proximity, for exchanging information between the paired mobile devices.

BACKGROUND OF THE INVENTION

Generally, transferring the data from one mobile device to another mobile device in proximity requires wireless communication connectivity such as Wi-Fi, Bluetooth, NFC or airdrop technologies and the data transfer can often be platform specific. In order to exchange data easily and independent of the platform supported by the devices, there is a need for a simpler way of exchanging information between the mobile devices without the need to use complex methods and with minimum user interaction with the device.

Conventional techniques for pairing mobile devices include shaking/bumping the mobile devices, which requires either mobile device motion or user motion. This results in complex and often unreliable outcomes. Other conventional methods include numerous user interactions, such as receiving pairing messages that require confirmations, entering or scanning secret codes and/or pin codes, etc. Therefore, prior methods for pairing and sharing data do not provide a streamlined and simple method, which limits user interactions, while sharing data securely amongst users.

SUMMARY OF THE INVENTION

The present disclosure relates to a system and improved techniques for pairing mobile devices based on the proximity of the mobile devices connected to a network. The system can include a server and downloadable application(s). The methods can pair mobile phones with one click by launching the application, without the need for the user to continuously look at the device. Once the devices are paired, the user can receive a confirmation of the transfer (e.g., via a visual, audible, and/or haptic feedback).

In general, one aspect of the subject matter described in this specification can be embodied in methods for pairing mobile devices. The method can include the actions of determining a geographic position of a first mobile device and a second mobile device, determining an angular orientation of the first mobile device and the second mobile device, and, if, during a predetermined time period, (i) the geographic position of the first mobile device and the second mobile device are within a predetermined proximity of each other and (ii) the angular orientation of the first mobile device and the second mobile device have a predetermined relationship, then pairing the first mobile device and the second mobile device. Other embodiments of this aspect include corresponding systems, apparatus, and computer programs.

These and other aspects can optionally include, before pairing the first mobile device and the second mobile device, determining that each of the first mobile device and the second mobile device are displaying a special screen indicating that the mobile device is ready to exchange information. The method can also include receiving information from at least one of the first mobile device and the second mobile device and delivering the received information to the other mobile device. In certain cases, the method can include receiving a request to revoke exchanged information from at least one of the first mobile device and the second mobile device and revoking the delivered information from the other mobile device. In some instances, the method includes recording exchange data related to the information received and delivered between the first mobile device and the second mobile device, where the exchange data includes a time stamp and/or a location of the receipt and delivery of the information. In some instances, the method includes delivering at least a portion of the exchange data to at least one of the first mobile device and the second mobile device.

In various embodiments, the action of determining the geographic position of the mobile devices can include using GPS data. In some cases, the action of determining the angular orientation of the mobile devices includes using a magnetometer. The predetermined time period can be in a range of about 1 second to about 10 seconds. The predetermined proximity can be a distance of less than 150 feet. In some instances, the predetermined relationship of the angular orientation of the first mobile device and the second mobile device includes (i) an axis normal to a screen of the first mobile device being substantially parallel to an axis normal to a screen of the second mobile device and (ii) a plane defined by the screen of the first mobile device being substantially parallel to a plane defined by the screen of the second mobile device. In some cases, the predetermined angular relationship can further include the first mobile device and the second mobile device being rotated an angle in a range of about 1 degree to about 90 degrees about the axes normal to the respective screens.

In general, another aspect of the subject matter described in this specification can be embodied in another method for pairing mobile devices. The method can include the actions of determining a unique sound produced by a first mobile device, receiving confirmation that a second mobile device heard the unique sound, and pairing the first mobile device and the second mobile device. Other embodiments of this aspect include corresponding systems, apparatus, and computer programs.

These and other aspects can optionally include, before pairing the first mobile device and the second mobile device, determining a second unique sound produced by the second mobile device and receiving confirmation that the first mobile device heard the second unique sound. In some cases, the receiving step includes receiving confirmation that the second mobile device heard the unique sound using a gyroscope of the second mobile device.

BRIEF DESCRIPTION OF DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION OF THE INVENTION

The following detailed description presents a description of certain specific embodiments to assist in understanding the claims. However, the present invention is intended to cover alternatives, modifications and equivalents, which may be included within the spirit and scope of the invention as defined by the claims. Furthermore, in the following detailed description numerous specific details are set forth in order to provide a thorough understanding of the present invention. However, it will be evident to one of ordinary skill in the art that the present invention may be practiced without these specific details.

Figure 1:
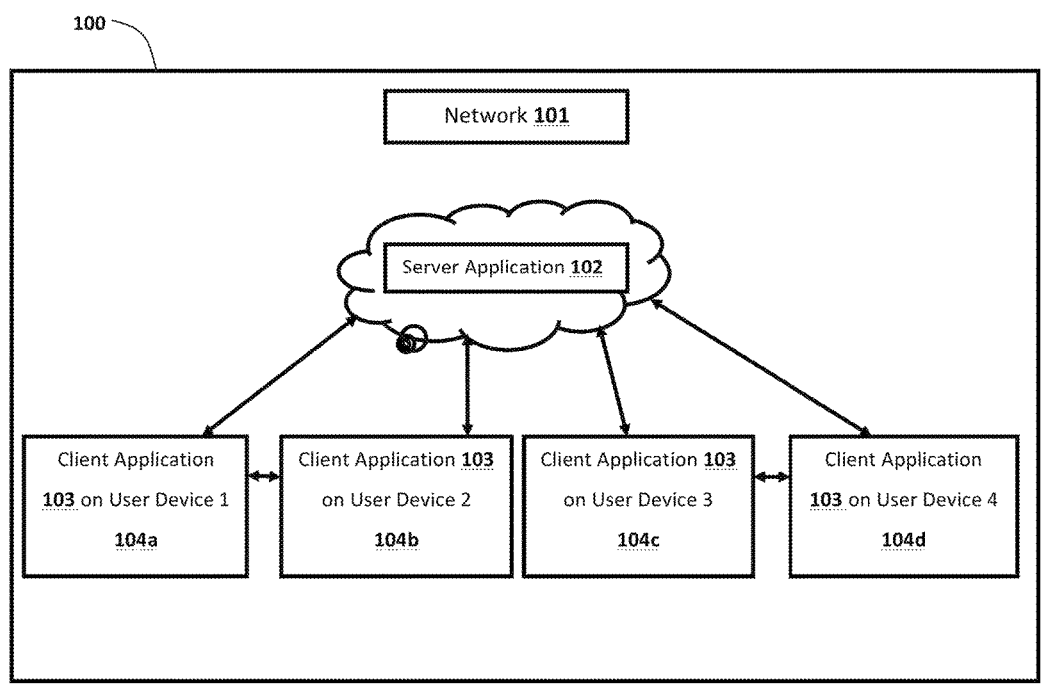
FIG. 1 is a schematic diagram of a system for exchanging information between a plurality of mobile devices, according to various implementations.

In various embodiments, a mobile device refers to a device on which a client application 103 (with reference to FIG. 1) can be installed for implementing exchange of information between a plurality of mobile devices that are paired based on the proximity of the mobile devices 104a, 104b, 104c, and 104d (with reference to FIG. 1). The terms "registered user" and "user" are used interchangeably in this disclosure.

FIG. 1 illustrates an example system 100 for exchanging information between a pair of mobile devices 104a, 104b, 104c, and 104d, wherein the mobile devices 104a, 104b, 104c, and 104d can be paired using at least two methods for determining the mobile devices to be paired by the system 100. In an embodiment, the system 100 comprises of a server application 102 installed on a server of a network 101, and the client application 103 installed on the user's mobile devices 104a, 104b, 104c, and 104d.

In an embodiment, a user's account can be registered with the client application 103 installed on the user's mobile devices 104a, 104b, 104c, and 104d. Upon registering with the client application 103, the server application 102 communicates with the client application 103 for exchanging information between mobile devices 104a, 104b, 104c, and 104d that are connected based on, for example, the two exemplary methods described herein for pairing the plurality of mobile devices 104a, 104b, 104c, and 104d.

In an embodiment, the server application 102 is configured to determine the geographic position and angular orientation of each of the plurality of mobile devices 104a, 104b, 104c, and 104d and the proximity of each of the plurality of mobile devices 104a, 104b, 104c, and 104d using various location identification techniques. For example, the geographic position and/or angular orientation can be determined using a magnetometer, an accelerometer, a gyroscope, and/or other sensors installed on the plurality of mobile devices 104a, 104b, 104c, and 104d being shared with the server application 102 through the client application 103. Further, based on this information, the server application 102 is configured to pair the mobile devices 104a, 104b, 104c, and 104d.

In another embodiment, the client application 103 is configured to release a unique sound from each of the plurality of mobile devices 104a, 104b, 104c, and 104d. The proximity of each of the plurality of mobile devices 104a, 104b, 104c, and 104d can be determined using various location identification techniques. Further, the unique sound can be identified via gyroscope through the client application 103 installed on the plurality of mobile devices 104a, 104b, 104c, and 104d being shared with the server application 102.

In an embodiment, the server application 102 is configured to receive the unique sound information that is sent from the client application 103. Further, based on this information, the server application 102 is configured to pair mobile devices 104a, 104b, 104c, and 104d that are in proximity to one another (e.g., detecting a sound produced by a mobile device in proximity).

In various embodiments, the server receives information about the readiness of the devices 104a, 104b, 104c and 104d to exchange information via the execution of a special screen displayed by the mobile device 104a, 104b, 104c and 104d.

In an embodiment, the server application 102 is configured to establish a connection between the paired mobile devices 104a, 104b, 104c and 104d for exchanging information. For example, as depicted in FIG. 1, a connection is established between the paired mobile devices 104a and 104b, and the mobile devices 104c and 104d.

Further, the server application 102 can be configured to initiate information exchange between the paired mobile devices 104a, 104b, 104c and 104d after determining the readiness for exchanging information determined on each of the paired mobile devices 104a, 104b, 104c and 104d.

Figure 2:
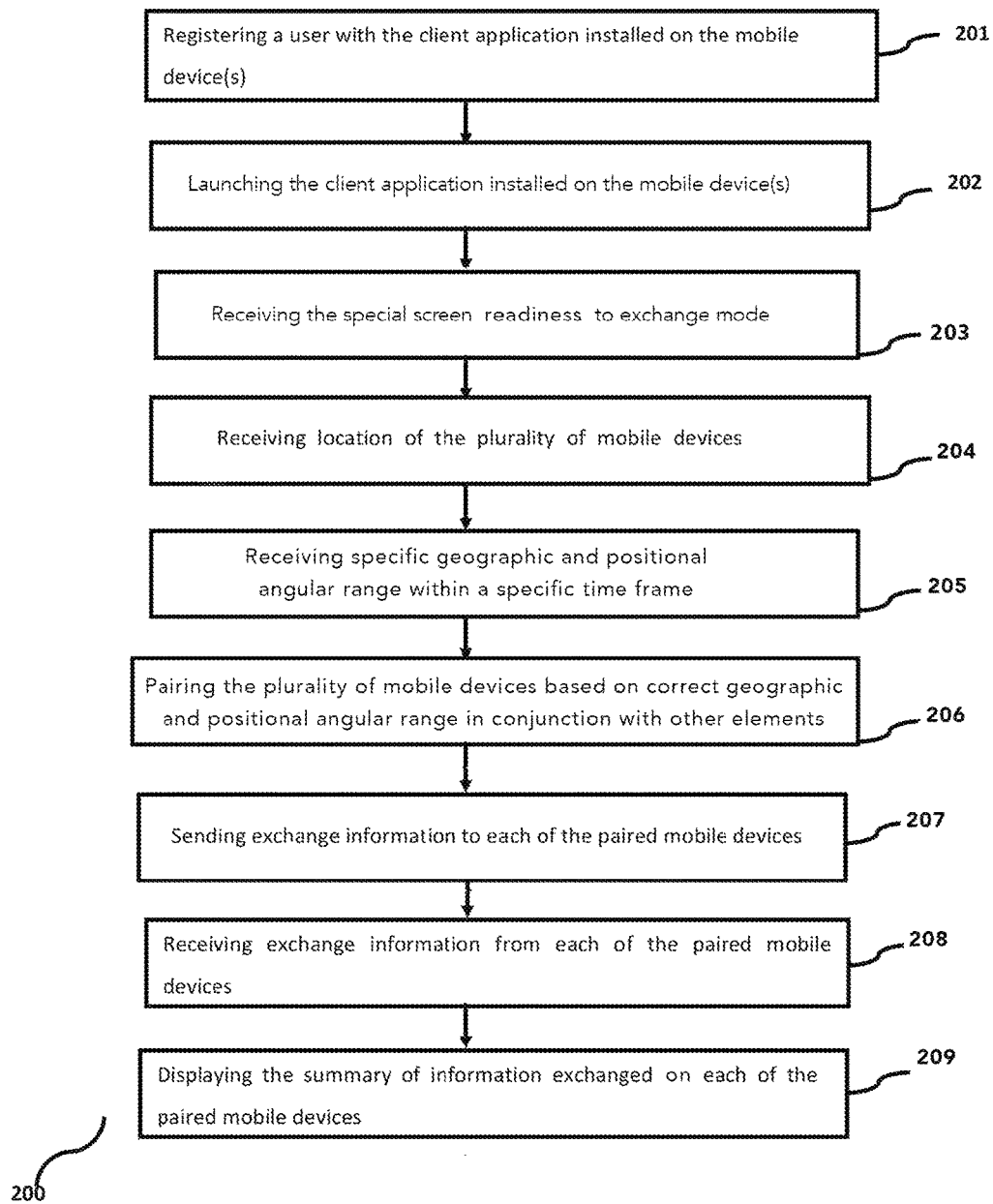
FIG. 2 is a flow chart of an example method for exchanging information between a plurality of mobile devices that are paired based on the specific geographic position and angular orientation of the two mobile devices in proximity, according to various implementations.

An example method 200 for exchanging information between two mobile devices is shown in FIG. 2. In some cases, the method can be implemented using the system 100 as shown in FIG. 1. At step 201, the method includes registering a user with the client application 103 installed on the mobile device(s) (401a, 401b). At step 202, the method includes launching the client application. At step 203, the method include displaying a special screen on the two mobile devices to alert the server application about the readiness to exchange the information. Further, at step 204 the method includes determining the location of the plurality of mobile devices (401a, 401b) that are intending to exchange information within the network 101. Further, at step 205 the method includes receiving at the server a specific geographic position and angular orientation within a specific time frame. The geographic position and angular orientation can be determined by a magnetometer, accelerometer sensor, and/or a gyroscope associated with the mobile devices (401a, 401b), At step 206, the method includes pairing the plurality of mobile devices (401a, 401b) that are intending to exchange information within the network 101. At step 207, the method includes exchanging the information through the server application 102. At step 208, the method includes exchanging the information with the client application 103 installed on the paired mobile devices (401a, 401b). At step 209, the method includes displaying the summary of information exchanged on the client application 103 installed on the paired mobile devices (401a, 401b).

Figure 3:
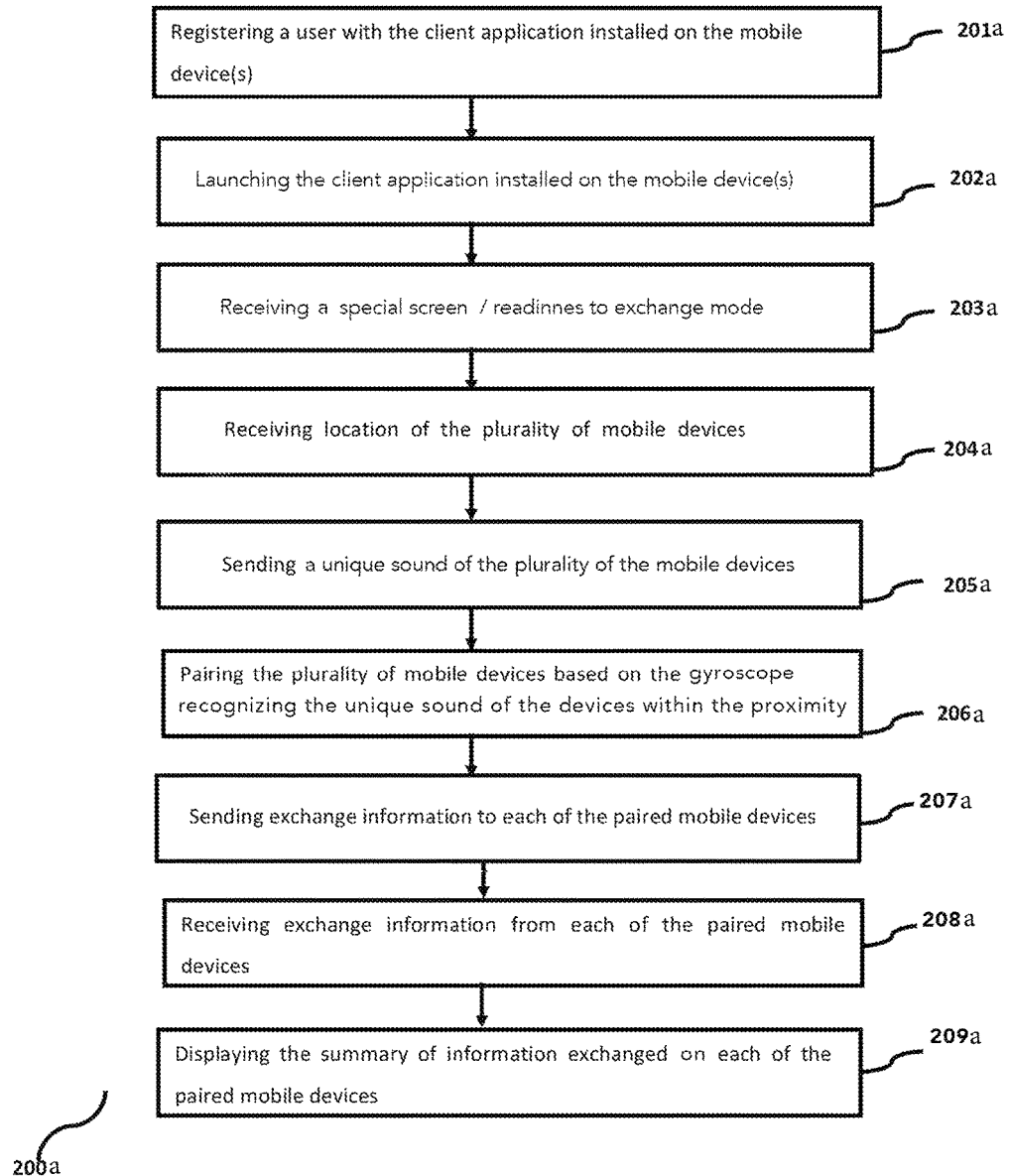
FIG. 3 is a flow chart of another example method for exchanging information between a plurality of mobile devices that are paired based on a unique sound produced by at least one of the mobile devices, according to various implementations.

Another example method 200a for exchanging information between two mobile devices is shown in FIG. 3. In some cases, the method can be implemented using the system 100 as shown in FIG. 1. At step 201a, the method includes registering a user with the client application 103 installed on the mobile device(s) (401a, 401b). At step 202a, the method includes launching the client application. At step 203a, the method includes displaying a special screen on the two mobile devices to alert the server application about the readiness to exchange the information. At step 204a, the method includes determining the location of the plurality of mobile devices (401a, 401b) that are intending to exchange information within the network 101. This step 204a, can include sending (205a) a unique sound through the client application 103 installed on devices (401a, 401b) that are intending to exchange information within the network 101 while a gyro sensor detects and identifies the unique sound coming from the other device within a network to determine the proximity of the two mobile devices (401a, 401b). At step 206a, the method includes pairing the two mobile devices (401a, 401b) based on the proximity and the sound recognition of the plurality of the mobile devices (401a, 401b) determined within the network 101. At step 207a, the method includes exchanging the information through the server application 102. At step 208a, the method includes exchanging the information with the client application 103 installed on the paired mobile devices (401a, 401b). At step 209a, the method includes displaying the summary of information exchanged on the client application 103 installed on the paired mobile devices (401a, 401b).

In various embodiments, the server application 102 is further configured to revoke information previously exchanged between the paired mobile devices 104a, 104b, 104c and 104d. For example, the information can be revoked after receiving a revoke request from the mobile device that delivered information. In general, exchanged information can be revoked at any time following an information exchange; however, in some cases a time limit can be implemented, e.g., within 30 seconds, within 1 minute, within 10 minutes, within 1 hour, within 24 hours, etc. In general, revoking information includes making it such that the receiving mobile device can no longer display the received information.

Figure 4:
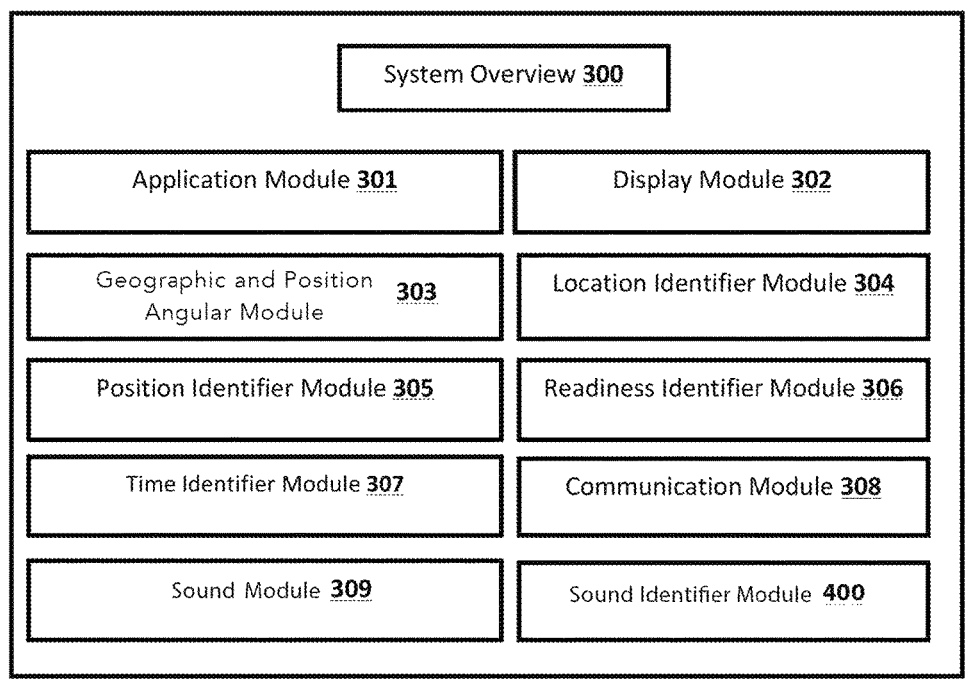
FIG. 4 is a schematic diagram of a system used for implementing the methods of exchanging information between a plurality of mobile devices that are paired based on a determination that the two mobile devices are in a "ready to exchange" mode, according to various implementations.

FIG. 4 illustrates a system overview 300 of components used for implementing the exemplary methods for exchanging information between a plurality of mobile devices 401a, 401b. The system can include the following components: an Application module 301, a Display module 302, a Geographic Position and Angular Orientation module 303, a Location Identifier module 304, a Position Identifier module 305, a Readiness Identifier module 306, a Time Identifier module 307, a Communication module 308, a Sound module 309 and a Sound Identifier Module 400. In an embodiment, the Application module 301 is configured to install the client application 103 (shown in FIG. 1) on a plurality of mobile devices 401a, 401b (shown in FIG. 1) within the network 101 (shown in FIG. 1). The client application 103 can allow the user to register with the application 103. The server application 102 (shown in FIG. 1) can be installed on the network server for validating the user account and facilitating information exchanging service across a plurality of mobile devices 401a, 401b. In an embodiment, the Display module 302 is configured to display the special screen mode as well as a summary of information exchanged through the client application 103 within the network 101. In an embodiment, the Geographic Position and Angular Orientation module 303 is configured to determine the position of the two mobile devices 401a, 401b, e.g., facing each other. The module 303 can use data from a magnetometer and other sensors within a specific time frame within the network 101, which can be sent to the server application 102 for pairing the mobile devices 401a, 401b. In an embodiment, the Location Identifier module 304 is configured to identify the location of the plurality of mobile devices 401a, 401b by using any known location identification techniques, such as Global Positioning System (GPS) data. In an embodiment, the Position Identifier module 305 is configured to identify the position of the plurality of mobile devices 401a, 401b. In some cases, the plurality of mobile devices 401a, 401b are placed facing each other for exchanging information. In an embodiment, the Readiness Identifier module 306 is configured to determine the readiness of the mobile devices 401a, 401b, for exchanging information through the client application 103 within the network 101. In an embodiment, the Time Identifier module 307 is configured to identify a limited time window for pairing of the mobile devices to determine the two devices ready to exchange information. In an embodiment, the Communication module 308 is configured to establish a communication between the paired mobile devices and to transfer data within the network 101. In an embodiment, the Sound module 309 is configured to create a unique sound for each user within the same location to be sent through client application 103 to mobile devices 401a, 401b. In an embodiment, the Sound Identifier module 400 is configured to use a gyroscope sensor to identify another user's unique sound, which can be used to identify the two devices 401a, 401b that are ready to be paired.

Figure 5:
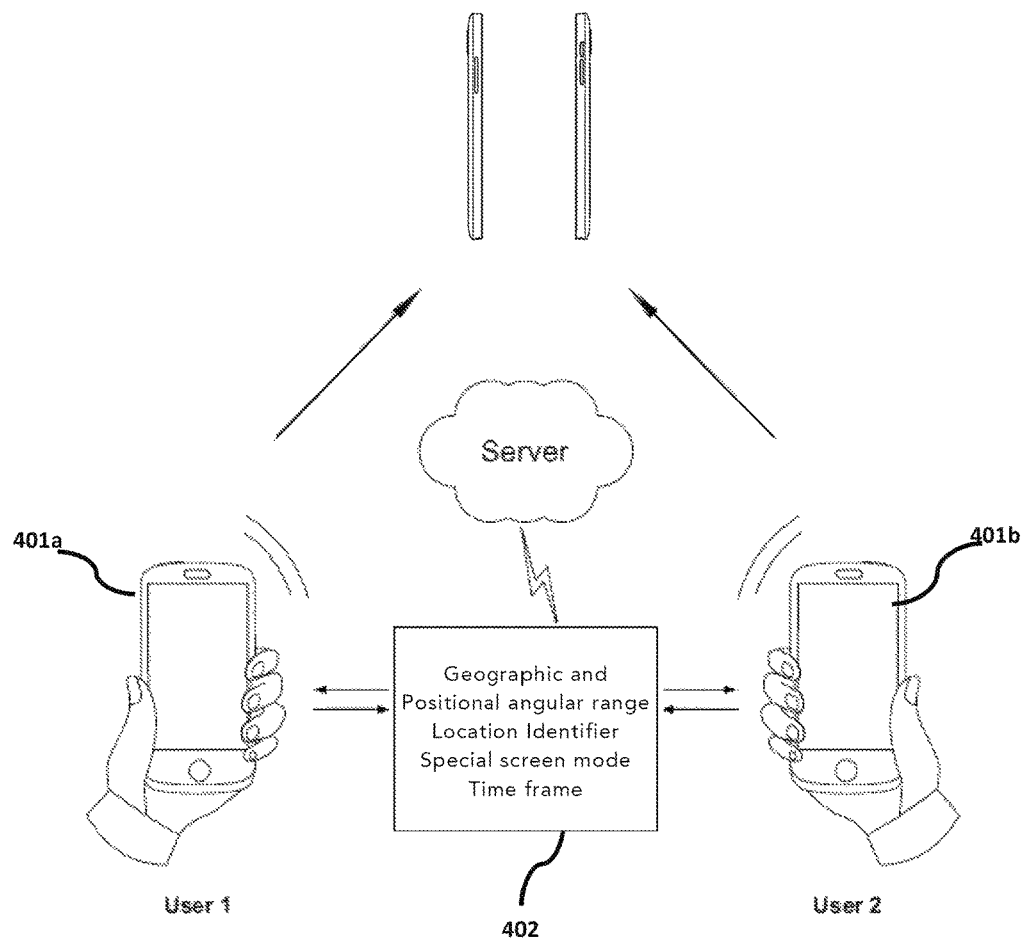
FIG. 5 is a schematic diagram of one technique for pairing two devices and initiating a transfer of the information between the paired devices through a server application, according to various implementations.

FIG. 5 is a schematic diagram illustrating an example technique for pairing two mobile devices in proximity to each other. In this example, the readiness of the plurality of mobile devices 401a, 401b (for pairing the mobile devices 401a, 401b) is determined based on the geographic position and angular orientation of the mobile devices 401a, 401b within a specified duration of time. The geographic position and angular orientation can be determined using a magnetometer, accelerometer sensor, and/or gyroscope. Other location identifier techniques are possible.

Figure 6:
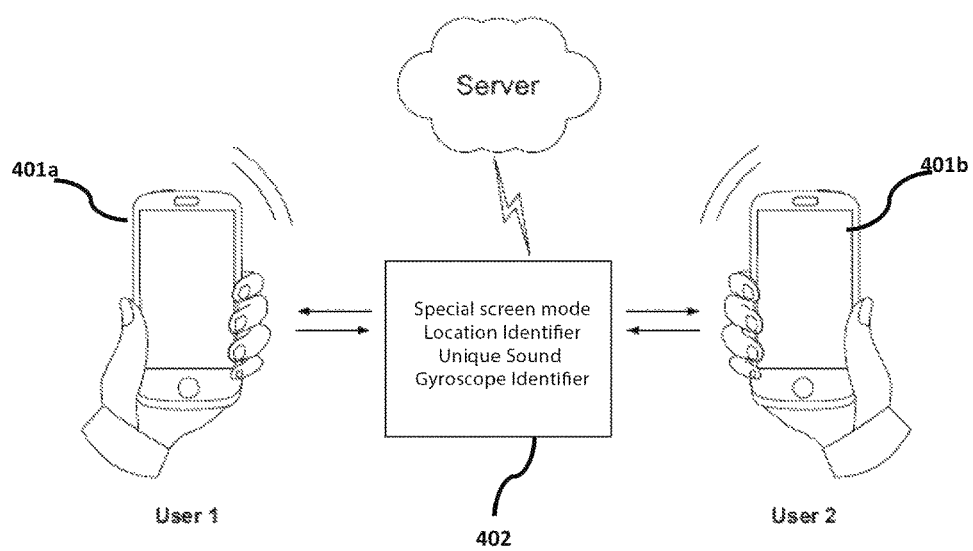
FIG. 6 is a schematic diagram of another technique for pairing two devices and initiating a transfer of information between the paired devices through a server application, according to various implementations.

FIG. 6 is a schematic diagram illustrating another example technique for pairing two mobile devices 401a, 401b in proximity. In this example, the proximity of the plurality of mobile devices 401a, 401b (for pairing the mobile devices 401a, 401b) is determined by the client application 103 releasing a unique sound. Mobile devices 401a, 401b can communicate the sounds they hear to the server 102. Thus, based on which mobile device hears which sound, the server 102 can determine mobile devices in proximity to each other, and pair the devices based, at least in part, on this information. In some cases, the unique sound is a sound not heard with normal human hearing, such as a low frequency sound. In some instances, the proximity of mobile devices 401*a*, 401*b* to be paired can be determined by other factors associated with the mobile devices 401*a*, 401*b*, such as a determination of which devices are executing a special screen mode and known location identification techniques. In an embodiment, the gyroscope 402 on the mobile device 401*a*, 401*b* is configured to detect and identify the unique sound and to alert a server 102.

Operating Apparatus

Figure 7:
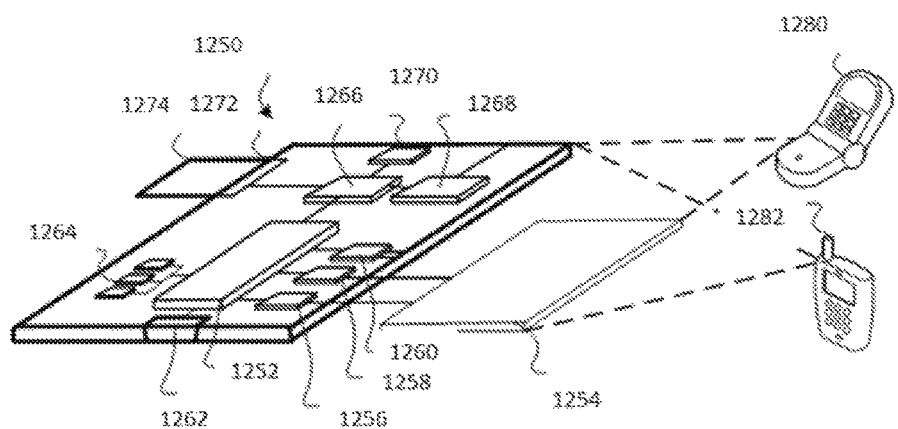
FIG. 7 illustrates an example mobile device that can be used in certain implementations.

FIG. 7 shows an example of a generic computing device 1250, which may be used with the techniques described in this disclosure. Computing device 550 includes a processor 1252, memory 1264, an input/output device such as a display 1254, a communication interface 1266, and a transceiver 1268, among other components. The device 1250 may also be provided with a storage device, such as a microdrive or other device, to provide additional storage. Each of the components 1250, 1252, 1264, 1254, 1266, and 1268, are interconnected using various buses, and several of the components may be mounted on a common motherboard or in other manners as appropriate.

The processor 1252 can execute instructions within the computing device 1250, including instructions stored in the memory 1264. The processor may be implemented as a chipset of chips that include separate and multiple analog and digital processors. The processor may provide, for example, for coordination of the other components of the device 1250, such as control of user interfaces, applications run by device 1250, and wireless communication by device 1250.

Processor 1252 may communicate with a user through control interface 1258 and display interface 1256 coupled to a display 1254. The display 1254 may be, for example, a TFT LCD (Thin-Film-Transistor Liquid Crystal Display) or an OLED (Organic Light Emitting Diode) display, or other appropriate display technology. The display interface 1256 may comprise appropriate circuitry for driving the display 1254 to present graphical and other information to a user. The control interface 1258 may receive commands from a user and convert them for submission to the processor 1252. In addition, an external interface 1262 may be provided in communication with processor 1252, so as to enable near area communication of device 1250 with other devices. External interface 1262 may provide, for example, for wired communication in some implementations, or for wireless communication in other implementations, and multiple interfaces may also be used.

The memory 1264 stores information within the computing device 1250. The memory 1264 can be implemented as one or more of a computer-readable medium or media, a volatile memory unit or units, or a non-volatile memory unit or units. Expansion memory 1274 may also be provided and connected to device 1250 through expansion interface 1272, which may include, for example, a SIMM (Single In Line Memory Module) card interface. Such expansion memory 1274 may provide extra storage space for device 1250, or may also store applications or other information for device 1250. Specifically, expansion memory 1274 may include instructions to carry out or supplement the processes described above, and may include secure information also. Thus, for example, expansion memory 1274 may be provided as a security module for device 1250, and may be programmed with instructions that permit secure use of device 1250. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1264, expansion memory 1274, memory on processor 1252, or a propagated signal that may be received, for example, over transceiver 1268 or external interface 1262.

Device 1250 may communicate wirelessly through communication interface 1266, which may include digital signal processing circuitry where necessary. Communication interface 1266 may in some cases be a cellular modem. Communication interface 1266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1268. In addition, short-range communication may occur, such as using a Bluetooth, WiFi, or other such transceiver (not shown). In addition, GPS (Global Positioning System) receiver module 1270 may provide additional navigation- and location-related wireless data to device 1250, which may be used as appropriate by applications running on device 1250.

Device 1250 may also communicate audibly using audio codec 1260, which may receive spoken information from a user and convert it to usable digital information. Audio codec 1260 may likewise generate audible sound for a user, such as through a speaker, e.g., in a handset of device 1250. Such sound may include sound from voice telephone calls, may include recorded sound (e.g., voice messages, music files, etc.) and may also include sound generated by applications operating on device 1250.

The computing device 1250 may be implemented in a number of different forms, as shown in FIG. 7. For example, it may be implemented as a cellular telephone 1280. It may also be implemented as part of a smartphone 1282, smart watch, personal digital assistant, or other similar mobile device.

Operating Environment

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method for pairing mobile devices, the method comprising the steps of:
   determining a geographic position of a first mobile device and a second mobile device;
   determining an angular orientation of the first mobile device and the second mobile device; and
   without sending a pairing message that requires confirmation to the second mobile device, pairing the first mobile device and the second mobile device when, during a predetermined time period, (i) the geographic position of the first mobile device and the second mobile device are within a predetermined proximity of each other and (ii) the angular orientation of the first mobile device and the second mobile device have a predetermined relationship, comprising a screen of the first mobile device facing a screen of the second mobile device.

2. The method of claim 1, further comprising:
   before pairing the first mobile device and the second mobile device:
      determining that each of the first mobile device and the second mobile device are displaying a special screen indicating that the mobile device is ready to exchange information.

3. The method of claim 1, further comprising:
   receiving information from the first mobile device; and
   delivering the information to the second mobile device.

4. The method of claim 3, further comprising:
   receiving a request to revoke the information from the second mobile device; and
   revoking the information from the second mobile device.

5. The method of claim 3, further comprising:
   recording exchange data related to the information received and delivered between the first mobile device and the second mobile device, wherein the exchange data comprises at least one of a time stamp and a location of the receipt and delivery of the information.

6. The method of claim 5, further comprising:
   delivering at least a portion of the exchange data to at least one of the first mobile device and the second mobile device.

7. The method of claim 1, wherein determining the geographic position comprises using GPS data.

8. The method of claim 1, wherein determining the angular orientation comprises using a magnetometer.

9. The method of claim 1, wherein the predetermined time period comprises a range of about 1 second to about 10 seconds.

10. The method of claim 1, wherein the predetermined proximity comprises a distance of less than about 150 feet.

11. The method of claim 1, wherein the predetermined relationship of the angular orientation of the first mobile device and the second mobile device further comprises:
    (i) an axis normal to the screen of the first mobile device being substantially parallel to an axis normal to the screen of the second mobile device; and
    (ii) a plane defined by the screen of the first mobile device being substantially parallel to a plane defined by the screen of the second mobile device.

12. The method of claim 11, wherein the predetermined angular relationship further comprises the first mobile device and the second mobile device being rotated an angle in a range of about 0.1 degrees to about 5 degrees about the axes normal to their respective screens.

13. A system for pairing mobile devices, the system comprising:
    one or more computers programmed to perform operations comprising:
       determining a geographic position of a first mobile device and a second mobile device;
       determining an angular orientation of the first mobile device and the second mobile device; and
       without sending a pairing message that requires confirmation to the second mobile device, pairing the first mobile device and the second mobile device when, during a predetermined time period, (i) the geographic position of the first mobile device and the second mobile are within a predetermined proximity of each other and (ii) the angular orientation of the first mobile device and the second mobile device have a predetermined relationship comprising a screen of the first mobile device facing a screen of the second mobile device.

14. The system of claim 13, wherein the operations further comprise:
    before pairing the first mobile device and the second mobile device:
       determining that each of the first mobile device and the second mobile device are displaying a special screen indicating that the mobile device is ready to exchange information.

15. The system of claim 13, wherein the operations further comprise:
    receiving information from at least one of the first mobile device and the second mobile device; and delivering the received information to the other mobile device.

16. The system of claim 15, wherein the operations further comprise:
recording exchange data related to the information received and delivered between the first mobile device and the second mobile device, wherein the exchange data comprises at least one of a time stamp and a location of the receipt and delivery of the information.

17. The system of claim 16, wherein the operations further comprise:
delivering at least a portion of the exchange data to at least one of the first mobile device and the second mobile device.

18. A computer implemented method for pairing mobile devices, the method comprising:
determining a unique sound produced by a first mobile device;
receiving confirmation that a second mobile device heard the unique sound and, based solely thereon, pairing the first mobile device and the second mobile device, without a requirement that an angular orientation of the first mobile device and the second mobile device have a particular relationship.

19. The method of claim 18, further comprising:
before pairing the first mobile device and the second mobile device:
determining a second unique sound produced by the second mobile device; and
receiving confirmation that the first mobile device heard the second unique sound.

20. The method of claim 18, wherein the receiving step comprises receiving confirmation that the second mobile device heard the unique sound using a gyroscope of the second mobile device.

* * * * *